April 12, 1960

A. MÄHLER 2,932,356

SUSPENSION OF HALF AXLES FROM THE FRAME OF MOTOR VEHICLES

Filed Aug. 12, 1957

Inventor
ARTHUR MÄHLER
BY Dike and Gay
ATTORNEYS

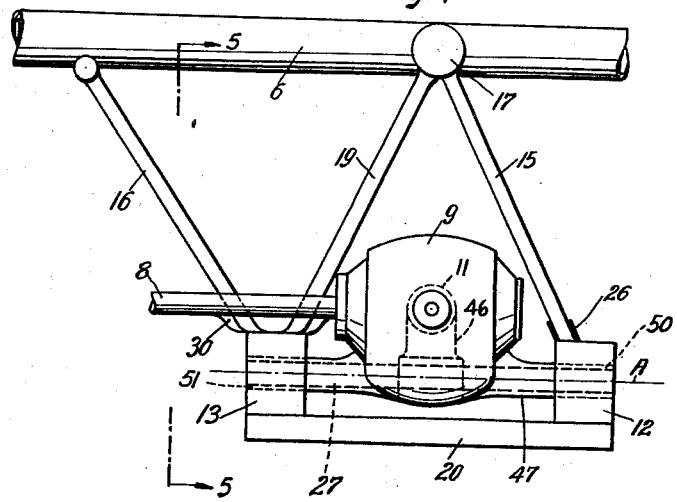
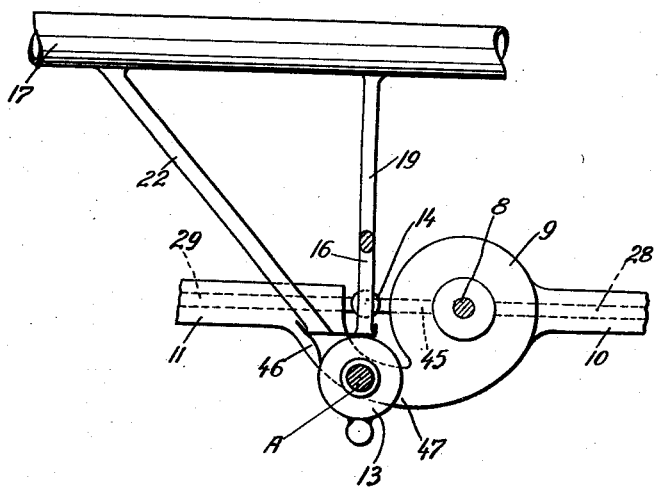

United States Patent Office 2,932,356
Patented Apr. 12, 1960

2,932,356

SUSPENSION OF HALF AXLES FROM THE FRAME OF MOTOR VEHICLES

Arthur Mähler, Fellbach, near Stuttgart, Germany, assignor to Daimler-Benz Aktiengesellschaft, Stuttgart-Unterturkheim, Germany Application August 12, 1957, Serial No. 677,680

Claims priority, application Germany August 11, 1956

13 Claims. (Cl. 180—73)

My invention relates to a suspension of swingable half axles from the frame of motor vehicles and, more particularly, is concerned with oscillatory half axles having a single joint and suspended from a frame composed of tubular elements, such suspension being effected by a carrier which preferably is formed by the axle-supporting housing.

It is known, particularly in sporting and racing cars, to compose the frame of the vehicle of tubular elements to reduce the weight of the frame. It is the object of the invention to provide an improved axle suspension for frames of this type, in which the braking and accelerating forces and lateral forces are transmitted to the frame by the suspension in a manner that will not subject the tubular elements of the frame to torques.

Further objects of my invention will appear from the detailed description of a number of embodiments of the invention with reference to the drawings. It is to be understood, however, that the invention is in no way restricted to such details and that the phrases and terms used in such detailed description have been chosen for the purpose of illustrating the invention rather than that of restricting or limiting the same.

In the accompanying drawings

Fig. 4 is a side view of the suspension diagrammatically shown in Figs. 1 and 2, and Fig. 5 is a sectional view taken along the plane indicated by the line 5—5 in Fig. 4.

Figure 1:
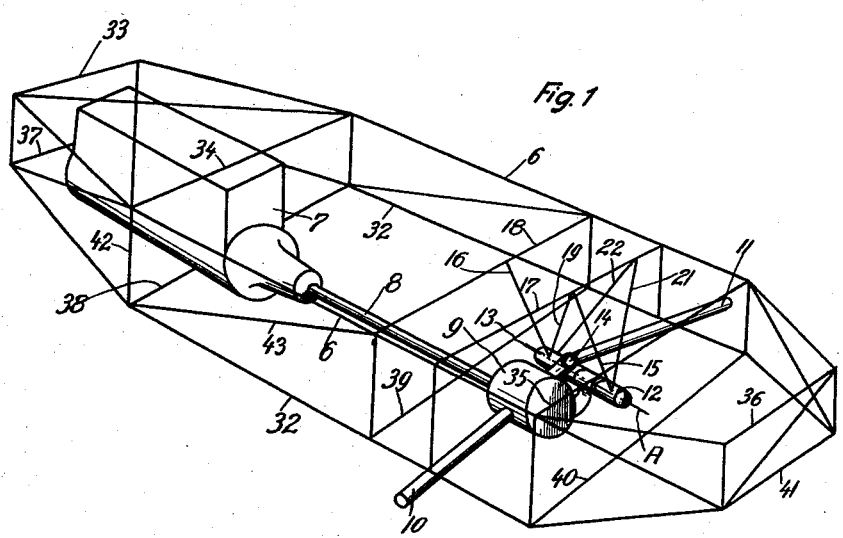
Fig. 1 is a perspective diagrammatic view of the entire frame composed of tubular bars.

As shown in Fig. 1 the frame of the motor vehicle is composed of tubular bars of small weight which are suitably connected and preferably welded to each other. More particularly, the frame includes upper longitudinal side bars 6, lower longitudinal side bars 32, the end sections of such bars converging towards the vertical central plane of the vehicle, upper transverse bars 33, 34, 18, 17, 35, 36 and lower transverse bars 37, 38, 39, 40, 41. The upper bars are disposed vertically above the associated lower bars. Thus it will be noted from Fig. 1 that the upper transverse bar 34 is located vertically above the transverse lower bar 38. Moreover, the frame includes a number of vertical side bars, such as 42, and diagonal side bars, such as 43, which need not be described in detail. Further diagonal bars or struts may be provided in transverse planes, for instance in the rear end plane and within the horizontal top plane extending through the transverse top bars 33 and 34.

The engine 7 mounted in the front section of the frame is connected with the rear axle transmission by a universal shaft 8. The housing 9 of the rear axle transmission forms part of and is rigidly connected with the half axle 10. Each of the two half axles 10 and 11 is tubular and accommodates a wheel-driving shaft 28, or 29 respectively. The housing 9 constitutes a carrier for the half axle 10. Suitable means are provided for mounting the half axles 10 and 11 for oscillation about a common longitudinal axis A, Figs. 1, 4 and 5. Such means include a pair of spaced bearings 12 and 13 disposed coaxially to the axis A. Preferably, the transmission housing 9 is disposed above and laterally of the bearings 12 and 13, the axes of the shafts 28 and 29 being disposed above the longitudinal axis A of oscillation in spaced relationship thereto. The universal shaft 8 is geared by a conventional differential transmission with the shaft 28 and a shaft 45, Fig. 5, which is coaxially disposed with respect to shaft 28 and is connected with the shaft 29 by a universal joint 14 disposed above the longitudinal axis A of oscillation. The axis A of the bearings 12 and 13 may or may not coincide with the vertical central longitudinal plane of the vehicle frame. Preferably, however, the axis A is laterally offset from such central plane so that the latter passes between the axis A and the transmission housing 9.

The ends of a horizontal pin 27 are mounted in the bearings 12 and 13 preferably by means of rubber bushings or other resilient means. Both, the half axle 11 and the housing 9 have depending arms 46 and 47 which are suitably journaled on the pin 27 to thereby afford the half axles 10 and 11 freedom of oscillation about the axis A. A more detailed description of the half axles 10 and 11, of the various shafts 28, 45 and 29 and of the rear axle transmission may be dispensed with since such details are old in the art.

My invention is primarily concerned with the connection of the bearings 12 and 13 with the vehicle frame. As will appear from Figs. 1 and 2 the bearings 12 and 13 constitute the connecting points on a spatial triangle assembly which is so composed of two plane trusses that they will intersect in the longitudinal axis A of both bearings. Hence, I have provided a pair of trusses, each truss being composed of struts or bars disposed within a common plane and forming at least one triangle with each other, said planes of said trusses extending at an angle and intersecting in a line substantially coinciding with the axis A.

Figure 2:
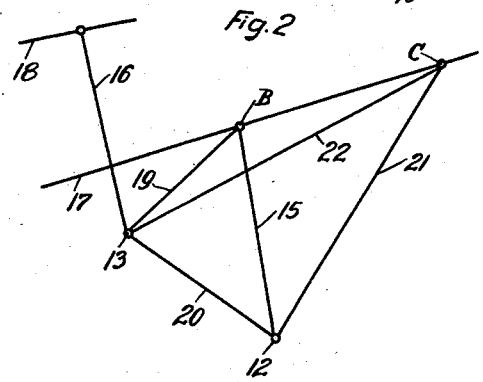
Fig. 2 is a detail of Fig. 1 shown on an enlarged scale.

As shown in Figs. 1 and 2 one of the two trusses is composed of the bars or struts 15, 16, 19, 20 disposed within a common plane of preferably vertical disposition, whereas the other truss is composed of the bars 20, 21 and 22 disposed within a common inclined plane. The plane defined by the bars 15, 16, 19 and 20 extends at an angle to the plane defined by the bars 20, 21 and 22. Both planes intersect in a line co-extensive with the bar 20. This line coincides substantially with the axis A of the bearings 12 and 13.

The bars 16, 19, 20 and 22 are connected with the bearing 13, whereas the bars 15, 20 and 21 are connected with the bearing 12 by conventional means such as welding. The strut 16 terminates at and is welded to the upper transverse bar 18. The bars or struts 15, 19 terminate at and are welded to the upper transverse bar 17 at the point B, whereas the upper ends of the bars 21 and 22 are welded to the transverse bar 17 at the point C.

From the foregoing it will appear that one of the two plane triangle assemblies is disposed within the vertical longitudinal plane of the vehicle including the axis A and is formed by the struts 15 and 16 which connect the bearings 12 and 13 with a pair of points of the frame spaced in longitudinal direction, such points being located on the transverse bars 17 and 18 for instance which extend substantially parallel. Between the struts 15 and 16 there is disposed a diagonal strut 19. For the purpose of closing the triangle assembly, the two bearings 12 and 13 are connected with each other by the strut 20. This triangle assembly is braced laterally by a second assembly solely composed of the struts 21, 22 and 20, such second assembly connecting the bearings 12 and 13 with a point of the frame, such as the point C on the transverse bar 17.

Figure 3:
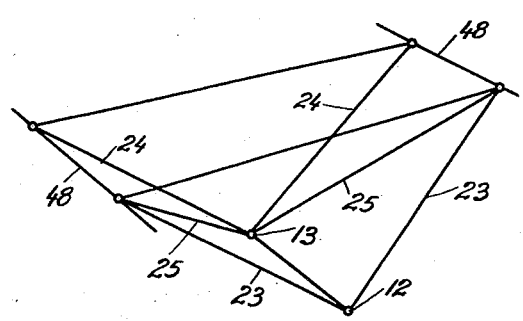
Fig. 3 is a view similar to that of Fig. 2 of a modification.

Alternatively, the bearings 12 and 13 may be braced by a pair of plane triangle assemblies or trusses disposed and constructed so as to be symmetric with respect to the longitudinal vertical plane including the axis A. Such an alternative embodiment of my invention is illustrated in Fig. 3. The two bearings 12 and 13 are braced against the frame by a pair of trusses each truss constituting a plane triangle assembly, the planes of such assemblies being inclined by equal angles. Each assembly comprises struts 23, 24 and 25 and a horizontal longitudinal frame bar 48 which extends parallel to the frame bar 6 and substantially in a common horizontal plane therewith. If desired, the angles of inclination of the two trusses may differ from each other and the structure of one truss might differ from the structure of the other truss. It is important, however, that the planes of the two trusses intersect substantially in the axis A.

In Figs. 4 and 5 I have shown the structural details of the suspension illustrated in Figs. 1 and 2. The rear axle transmission housing 9 together with the other half axle 11 is mounted for oscillation about the axis A in the bearings 12 and 13 by means of the pin 27. The housing 9 is disposed laterally and at a higher level than said bearings, the latter being disposed within the central longitudinal plane of the vehicle, so that the half axle 11 is disposed above the axis A. The shafts 28, 29 for driving the wheels extend within the two half axles. These shafts are interconnected by a universal joint 14 which may be enclosed by an extension of the housing 9 if desired.

The bearings 12 and 13 may be constructed as cylindrical tubular members disposed in coaxial relationship with the axis A. The pin 27 is preferably mounted within the bearings by resilient means, for instance by means of rubber sleeves 50, 51. To facilitate the assembly one of the two bearings, such as the front bearing 13, may be split in a horizontal central plane. If desired, however, both bearings may be split in the same manner. The lower section of the bearing is releasably connected with the upper section by suitable bolts or the like.

The bracing struts engage the upper bearing section and are preferably welded thereto. If desired, the connections effected by welding, for instance, may be reinforced by inserted plates 26 and 30. Special sheet metal members may be inserted between the struts and the bearings and may be welded thereto. It is important that the struts or bars are so connected with the bearings that the axes of said bars extend substantially through the center of said bearings. Owing to such position no torques will be produced and the struts forming part of the two plane trusses are subjected to tension or pressure only by longitudinal and transverse forces. The bars or struts are tubular members. Those bars which are subject to particularly high forces, for instance the tubular member constituting the transverse bar 17, may have a larger diameter and/or cross section than the other bars.

The strut or bar 20, common to the two trusses, is preferably releasably connected with the bearings 12 and 13. Where such bar 20 is fixed to the lower detachable sections of the bearings, it may be so fixed by welding in a non-releasable manner. Where one of the two bearings, for instance the front bearing 13, only is split, then it is preferable to connect the strut 20 detachably, for instance by bolts, with the non-split bearing 12 and to connect it non-detachably with the lower section of the split bearing.

From the foregoing description it will appear that my novel suspension of swingable half axles from the frame of motor vehicles, particularly of single joint half axles from a tubular frame is so effected by means of an axle carrier, preferably by means of the rear axle transmission housing, that the axle carrier is preferably suspended by means of a pair of bearings disposed lengthwise with respect to the vehicle, such bearings being braced on the frame by a spatial triangle assembly consisting of plane triangle trusses intersecting in the longitudinal axis of both bearings.

In a preferred embodiment of the invention both bearings are offset from the longitudinal vertical central plane of the frame, such central plane passing between the transmission housing and the axis of oscillation. In such structure a plane triangle assembly or truss is disposed in the vertical longitudinal plane extending through the two bearings and is laterally braced by a second triangle assembly.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a motor vehicle the combination comprising a frame, a pair of half axles, means for mounting the latter on said frame for oscillation about a longitudinal axis of said frame, said means including a pair of spaced bearings coaxial to said axis, a pair of trusses extending between said bearings and said frame, each truss being composed of bars disposed within a common plane and forming at least one triangle with each other, said planes of said trusses extending at an angle formed therebetween and intersecting in a line substantially coinciding with said axis.

2. The combination claimed in claim 1 in which said axis is offset from the longitudinal central plane of said frame.

3. The combination claimed in claim 1 in which said planes are laterally inclined in opposite directions.

4. The combination claimed in claim 1 in which said planes are symmetrically inclined with respect to a vertical plane including said axis.

5. The combination claimed in claim 4 in which said vertical plane is the central longitudinal plane of said frame.

6. The combination claimed in claim 1 in which said plane of one of said trusses is disposed vertically and said plane of the other one of said trusses inclined laterally.

7. The combination claimed in claim 1 in which at least one of said trusses includes a pair of spaced substantially parallel bars extending from said bearings to longitudinally spaced points on said frame and a diagonal bar disposed therebetween.

8. The combination claimed in claim 1 in which one of said trusses is laterally inclined and is composed of a pair of rods connecting said bearings with a common point of said frame.

9. The combination claimed in claim 1 in which said spaced bearings are connected by a rod constituting an element common to both of said trusses.

10. The combination claimed in claim 1 in which the connection of some of said bars with said bearings is so disposed that the axes of said bars extend substantially through the center of said bearings.

11. The combination claimed in claim 1 in which said means also include rubber bushings disposed within said bearings.

12. The combination claimed in claim 1 in which said half axles are tubular, the combination further comprising wheel shafts mounted within said half axles, the axes of said shafts being disposed above said longitudinal axis of oscillation in spaced relationship thereto.

13. The combination claimed in claim 12 which further comprises means for cooperatively connecting said shafts including a universal joint disposed above said longitudinal axis of oscillation.

No references cited.